United States Patent [19]

Lawrence

[11] Patent Number: 4,818,401
[45] Date of Patent: Apr. 4, 1989

[54] ROTARY FILTRATION DEVICE

[76] Inventor: William J. Lawrence, 5 Harbor La., Kemah, Tex. 77565

[21] Appl. No.: 220,154

[22] Filed: Jul. 18, 1988

[51] Int. Cl.$^4$ .............................................. B01D 33/22
[52] U.S. Cl. .................................. 210/330; 210/380.1
[58] Field of Search ............ 210/780, 330, 331, 360.1, 210/380.1

[56] References Cited

U.S. PATENT DOCUMENTS

| | | | |
|---|---|---|---|
| 1,269,067 | 6/1918 | Enell | 210/331 |
| 2,038,921 | 4/1936 | Blaufuss | 210/330 |
| 3,395,801 | 8/1968 | Muller | 210/331 |
| 3,997,447 | 12/1976 | Breton et al. | 210/780 |
| 4,243,536 | 1/1981 | Prolss | 210/331 |
| 4,698,156 | 10/1987 | Bumpers | 210/360.1 |

Primary Examiner—Ivars Cintins
Attorney, Agent, or Firm—Tim L. Burgess

[57] ABSTRACT

A filtration device includes in a pressure vessel a driven rotary shaft having a longitudinal bore into which fluid suspension to be processed to recover the fluid is pumped. The suspension is expelled into a processing zone in the vessel from distributing passages fluidly communicating the bore to the cavity of the pressure vessel. The processing zone is adjacent filtration discs affixed to the rotating shaft. The filtration plates are laminates in which an inner conducting support layer is enclosed by an outer filtration layer, the layers being porous, the pores being in fluidic communication, and the pores of the inner layer being larger than the pores in the outer layer. Fluid collecting in the outer layer of a spinning filter disc flows from the inner layer through collecting passageways to a second longitudinal bore in the shaft, and is removed from the vessel through a conduit fluidly communicating with such second longitudinal bore.

3 Claims, 2 Drawing Sheets

ROTARY FILTRATION DEVICE

1. Field of the Invention

This invention relates to rotary filtration devices for continuous filtration of solid materials from fluid medium in which solids are suspended, and more particularly, relates to continuous filtration devices in which the filtration medium is a porous element, such as ceramic or sintered metal discs or plates, rotated within the fluid suspension.

2. Background of the Invention

As disclosed in U.S. Pat. No. 3,997,447 issued Dec. 14, 1976 to Breton et al, it is known to rotate through a fluid suspension a porous filtration element composed of a laminated structure comprised of combinations of porous layers in which the pores of each layer are in open communication. The filtration elements are usually constructed from sinterable metal or ceramic powders which have been sized and formed into laminated plates of interconnecting and communicating pores by powder metallurgy techniques or with fine screens having micron range pore sizes made using expanded metal technology, or by selective dissolution techniques. Several preparation methods are disclosed in U.S. Pat. No. 3,997,447. In the filtration elements, an interior layer of large pore sizes acts as a support and collecting layer for an outer confining layer of smaller pore sizes. The pore sizes may be submicron and larger. Thus, for example, an application of such filtration devices may be to remove minute particles from lake or other intake water used in steam injection plants or in nuclear power plants to reduce corrosion buildup in steam lines and reduce problems of disposal of particles in primary cooling loop steam which would be made radioactive. As disclosed in U.S. Pat. No. 3,997,447, the sintered metal powder filtration element conventionally is fabricated into structure such as annular plates, attached to a hollow shaft. Fluid separated from suspended matter in a fluid suspension through which the element is rotated flows from the outer to the inner layer of the element and courses through admitting slots provided in the hollow shaft to a conduit leading to the exterior of the shaft for collection at a remote point. U.S. Pat. No. 3,997,447 is particularly directed to a problem encountered in these devices, namely accumulation of filter cake buildup of separated solids in and about the rapidly rotating filtration elements. Another difficulty with the rotating filter disc technology disclosed by U.S. Pat. No. 3,997,447, is that to be processed by the spinning filter discs, the fluid suspension must be in a processing zone which is between the shaft and the tips of the spinning microdiscs, and to gain access to the processing zone, the fluid suspension must flow radially inwardly past the tips against the flow direction of solids and fluids centrifugally cast radially outwardly from the shaft.

Other patents which may have pertinance are U.S. Pat. No. 3,395,801; U.S. Pat. No. 2,038,921; U.S. Pat. No. 1,269,067 and U.S. Pat. No. 1,038,607.

BRIEF DESCRIPTION OF THE INVENTION

It is an object of my invention to provide a more efficient filtration device which overcomes the above described limitations inherent in prior structure used in high speed rotating microdiscs.

In accordance with my invention, I have improved the rotating assembly of a filtration device for filtering fluid medium for matter in a fluid suspension. The improvement comprises a rotary shaft containing an inflow bore and an outflow bore both parallel to each other and to the longitudinal axis of the shaft. The inflow bore is adapted to be connected to a conduit providing a fluid path between a remote source of the fluid suspension to be processed and the inlet bore. The outlet bore is adapted to be connected to an outlet conduit providing a fluid path from the outflow bore to a place for collecting filtrate. Fluid suspension distribution means are circumferentially and coaxially provided in fluid communication with the inflow bore to distribute fluid suspension from the inflow bore exteriorly out of the shaft into a processing zone adjacent annular porous filtration members attached to the shaft. The filtration members are of the type constructed from powders, are well known in the art, and comprise a porous inner support layer and porous outer filtration layer enveloping the inner support layer. The pores in the outer layer are smaller than the pores in the inner layer and the pores of both layers are in fluid communication each with the other such that, upon immersion in a fluid suspension, the fluid medium can pass from the outer layer to the inner layer. Filtrate distribution means radially inwardly concentric to the filtration member and circumferentially coaxially in fluid communication with the outflow bore distribute filtrate from the filtration member into the outflow bore. Sealing means juxtaposed above and below each filtration member fixedly sealingly engage the shaft and engage the filtration member to seal off fluid communication between the fluid suspension distribution means and the filtrate distribution means.

In use, upon application of a pressure differential to inlet and outlet conduits to cause a flow of fluid suspension through the inlet conduit, the fluid suspension flows through the inflow bore, thence through the fluid suspension distribution means to a processing zone adjacent a filtration member. There fluid is filtered from the suspension and goes through the filtration member from the outer layer to the inner layer. Filtrate then flows from the inner layer through the filtration distribution means through the outflow bore to the outlet conduit for collection. In accordance with my invention, fluid suspension is thus introduced into the processing zone radially outwardly from the rotating shaft rather than having to gain access to the zone radially inwardly, and filtration thereby is enabled to proceed more efficiently and effectively.

DESCRIPTION OF THE PREFERRED EMBODIMENT

Figures 1, 3, 4:
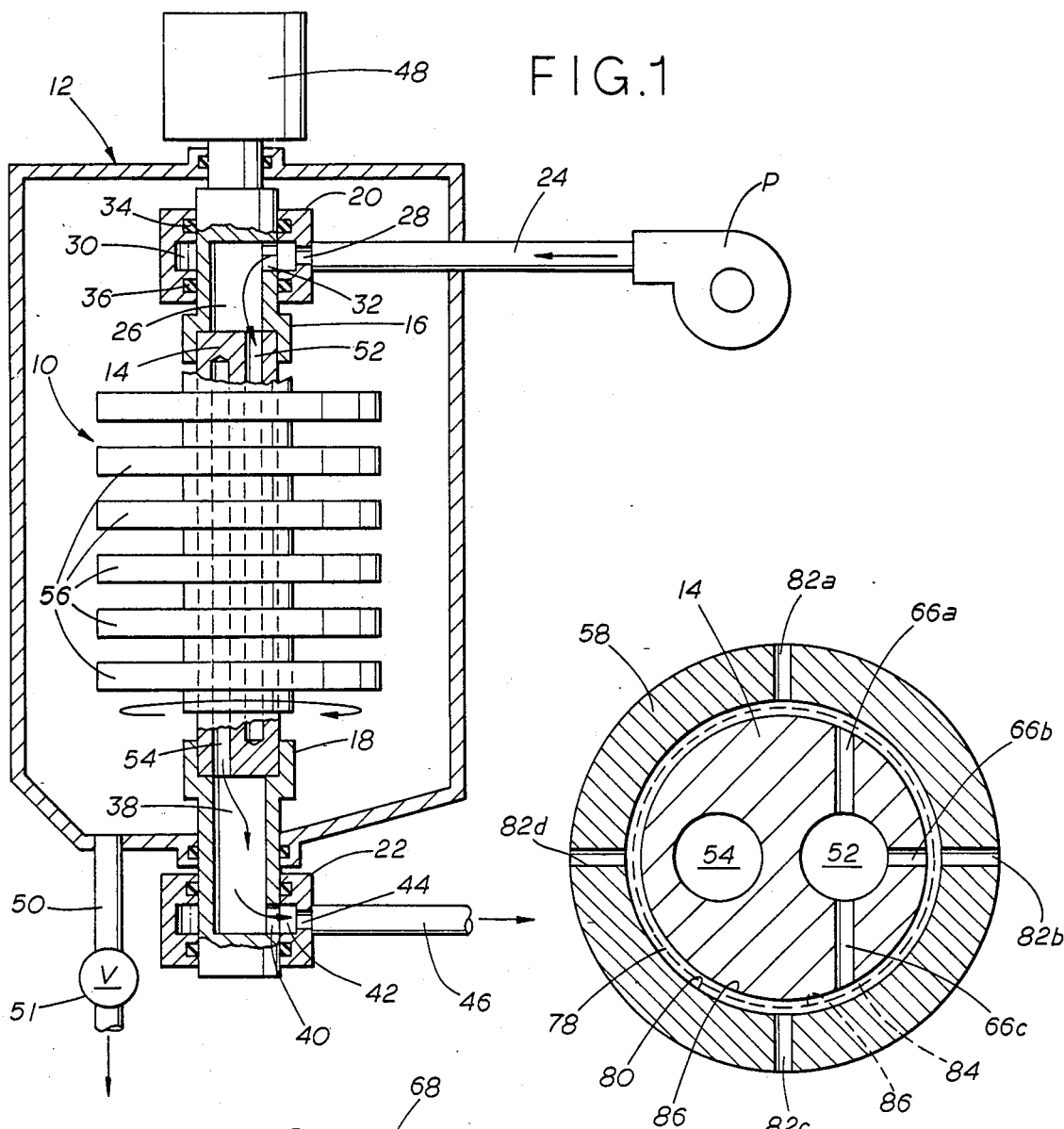
FIG. 1 is an elevational partial section of a high speed rotary filter.
FIG. 3 is a horizontal cross-section of a filter distribution element taken along the lines 3—3 of FIG. 2.
FIG. 4 is a horizontal cross-section of a filter processing element taken along the lines 4—4 of FIG. 2.

In the drawings there is shown a preferred embodiment of an improved filtration device in accordance with my invention. Referring to FIG. 1, a rotating assembly indicated generally by reference numeral 10 is mounted within a pressure vessel 12, and includes a vertically disposed rotary shaft 14 connected to top to a rotary coupling inflow conduit 16 and at bottom to rotary coupling outflow conduit 18. Rotary coupling conduits 16, 18 respectively are aligned and journaled within bearing support manifolds 20, 22. Inlet conduit 24 is in fluid communication with the hollow interior 26 of coupling inflow conduit 16 by means of port 28, annulus 30 and slots 32. Fluid suspension admitted through inlet conduit 24 is confined within annulus 30 by seals 34, 36. Similarly, at the base of the pressure vessel, the interior 38 of rotary coupling outflow conduit 18 is in fluid communication through slots 40, annulus 42, and port 44 to outlet conduit 46. A drive motor 48 imparts rotational motion to rotary shaft 14 through coupling conduit 16. A drain 50 choke valved at 51 provides means for maintenance of desired pressure in vessel 12 and flush of separated materials and residual fluids suspension from vessel 12.

Figure 2:
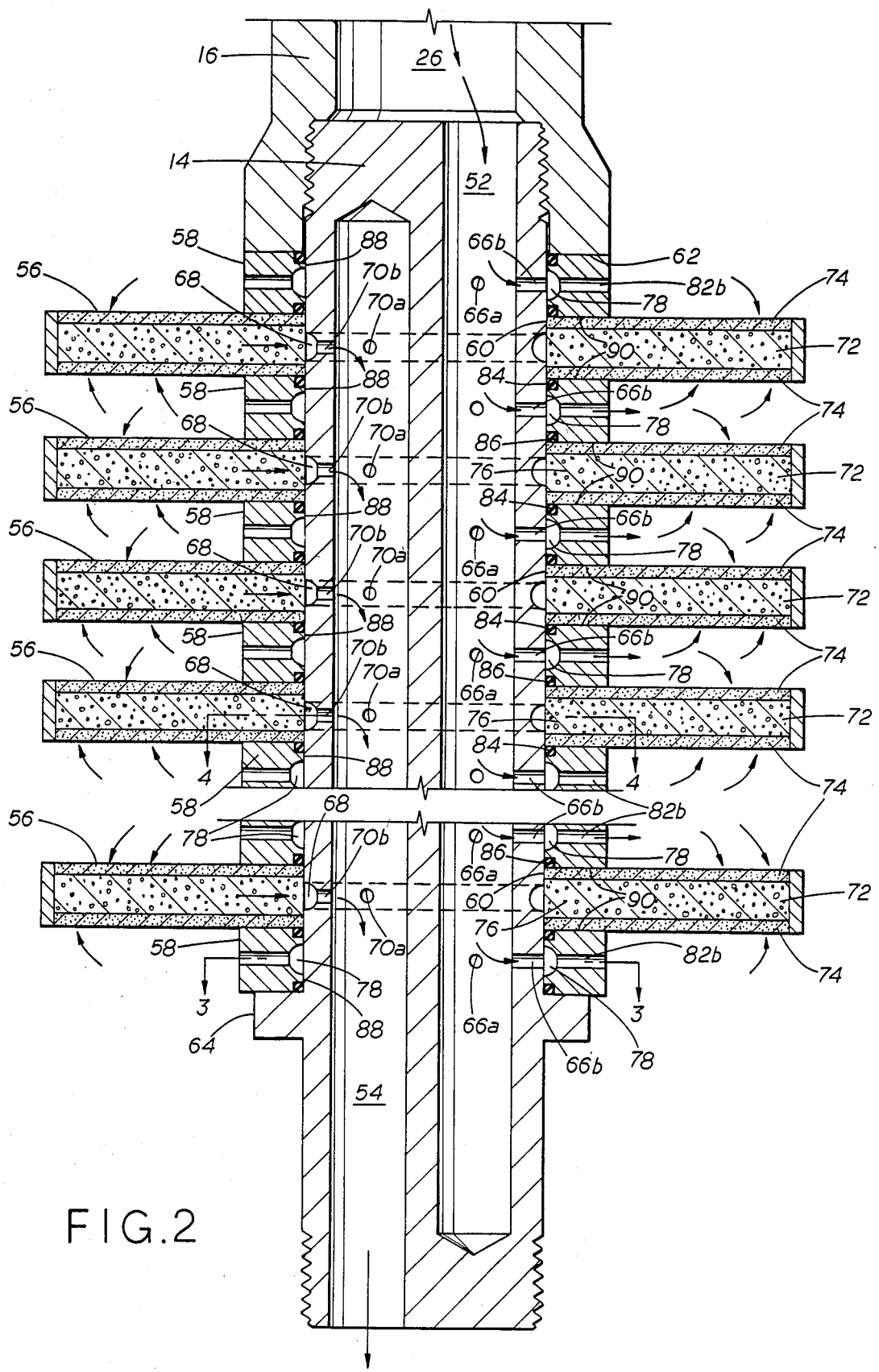
FIG. 2 is a vertical cross-section of a portion of the filter of FIG. 1.

Referring both to FIGS. 1 and 2, rotary shaft 14 includes an inflow bore 52 in fluid communication with the interior hollow of coupling conduit 16 and an outflow bore 54 in fluid communication with the interior hollow of coupling conduit 18. Attached to shaft 14 are a plurality of annular porous filtration elements 56, and adjacent each element, a fluid suspension distribution member 58. Inflow bore 52 and outflow bore 54 are substantially parallel one to the other and each are substantially parallel to the longitudinal axis of rotary shaft 14.

Referring to FIG. 2, annular porous filtration members 56 and annular fluid distribution members 58 in alternating sequence are coaxially engagingly fitted at their inner diameter to the outer diameter of cylindrical rotary shaft 14, with fluid distribution members 58 above and below each fluid filtration element 56. The filtering elements 56 and fluid distribution members 58 are clamped into place by shoulder 62 of coupling 16 pressing against retainer ring 64 of shaft 14. The engagement fit of fluid suspension distribution members 58 and filtration elements 56 and the clamping action of coupling 16 on shaft 14 by ring 64 are correlated to assure that distribution members 58, filtration elements 56 and shaft 14 rotate as one body.

Referring to FIG. 3 in conjunction with FIG. 2, a plurality of portways 66a, 66b, and 66c, all substantially normal to the axis of inflow bore 52, connect the inflow bore 52 with the exterior of shaft 14.

Referring to FIG. 4 in conjunction with FIG. 2, a plurality of circumferential external grooves 68 are provided in the periphery of shaft 14. Grooves 68 are coaxially disposed to the longitudinal axis of shaft 14 and spaced apart at predetermined intervals along the length of the shaft. Referring to FIG. 2, portways 66 (66a and 66b are visible) are disposed along the length of shaft 14 with at least one portway above and at least one portway below each of adjacent ones of the plurality of circumferential grooves 68. Referring to FIG. 4 in connection with FIG. 2, groove passageways 70a, 70b and 70c interconnect each groove 68 with outflow bore 54, substantially normal to axis of outflow bore 54.

Referring to FIG. 4 in conjunction with FIG. 2, annular porous filtration members 56 comprise a porous inner support layer 72 and porous outer filtration layer 74 enveloping inner support layer 72. The pores in the outer layer 74 are smaller than the pores in the inner layer 72. The pores in layer 72 and 74 are in fluidic communication, such that upon immersion of filtration member 56 into a fluid suspension, the fluid medium can pass from outer layer 72 into inner layer 74. Support layer 72 is aligned at the inner diameter 76 thereof with external groove 68.

Referring to FIG. 3 in connection with FIG. 2, the fluid suspension distribution members 58 have a circumferential distributing annulus 78 in the inner diameter 80 of member 58. Fluid ways 82a, 82b, 82c, and 82d substantially normal to the axis of member 58 fluidly communicate annulus 78 radially outwardly to the exterior of member 58. Sealing means, suitably O-ring seals 84 of diameter to friction fit to shaft 14 are seated within annulus ring grooves 86 provided at the margin between the inner diameter 88 of member 58 and the lateral face 90 of member 58 juxtaposed to the opposing outside face of layer 74 of member 56. Members 58 provide O-rings 84 juxtaposed above and below each rotation member coaxially fixedly sealingly engaging shaft 14 and engaging the adjacent filtration member 56 to seal off fluid communication between member 58 and filtration 56.

In operation, a fluid suspension to be processed is pumped under pressure into pressure vessel 12 by inlet 24 through fluid passageways 24, 28, 30, 32, 26 into inflow bore 52. In bore 52, the fluid suspension discharges from bore 52 through portways 66 into distributing annulus 78 and out distributing annulus 78 through fluidways 82 into the cavity of pressure vessel 12. When sufficient fluid suspension has been introduced to raise the level of the fluid suspension above the uppermost filtration member 56, drive motor 48 is activated and rotary assembly 10 is brought to a desired speed of rotation. Choke valve 51 is adjusted to maintain the desired back pressure in vessel 12. Fluid suspension continuing to be pumped through bore 52 from inlet 24 and exiting as above described through fluidways 82 is expelled into a processing zone adjacent opposing faces 74 of filtration members 56. Shearing forces imposed by the spinning filter discs acting on the suspension are processingly applied to the suspension at the pores of outer layer 74 and fluid filtrate passes layer 74 into layer 72. From there the filtrate is collected by collecting groove 68 and passes into outflow bore through collecting groove passageways 70. The filtrate flows from outflow bore 54 into hollow 38 and passages 40, 42, 44 into outlet conduit 46.

Various modifications and changes may be made to the preferred embodiment disclosed herein yet be within the scope and spirit of the invention, and such modifications and changes are comprehended within the claims which now follow:

I claim:

1. In a filtration device including a rotating assembly for filtering fluid medium from matter in a fluid suspension which is external to the rotating assembly, the improvement in the rotating assembly which comprises:
   a. a rotary shaft having a longitudinal axis and containing:
      (1) an inflow bore having an axis substantially parallel to the longitudinal axis of said shaft, and
      (2) an outflow bore spaced apart from and substantially parallel to said inflow bore,
   b. at least one annular porous filtration member coaxially fixedly engaging said shaft and comprising a porous inner support layer and a porous outer filtration layer enveloping the inner support layer, the pores in the outer layer being smaller than the pores in the inner layer, the pores of said layers being in fluidic communication so that upon immersion in a said fluid suspension the fluid medium can pass from the outer layer to the inner layer, c. fluid suspension distribution means circumferentially coaxially in fluid communication with such inflow bore for distributing fluid suspension from said inflow bore exteriorly of said shaft into a processing zone adjacent said annular porous filtration member, d. filtrate distribution means circumferentially coaxially in fluid communication with said outflow bore and radially inwardly concentric to said filtration member for distributing filtrate from said filtration member into said outflow bore, and e. sealing means juxtaposed above and below said filtration member coaxially fixedly sealingly engaging said shaft and engaging said filtration member for sealing off fluid communication between said fluid suspension distribution means and said filtrate distribution means.

2. A filtration device for filtering fluid medium from matter in fluid suspension, comprising:

a. a rotary shaft having a longitudinal axis and containing:
  (1) an inflow bore having an axis substantially parallel to the longitudinal axis of said shaft, and
  (2) an outflow bore spaced apart from and substantially parallel to said inflow bore, b. at least one annular porous filtration member coaxially fixedly engaging said shaft and comprising a porous inner support layer and a porous outer filtration layer enveloping the inner support layer, the pores in the outer layer being smaller than the pores in the inner layer, the pores of said layers being in fluidic communication so that upon immersion in a said fluid suspension the fluid medium can pass from the outer layer to the inner layer, c. fluid suspension distribution means circumferentially coaxially in fluid communication with such inflow bore for distributing fluid suspension from said inflow bore exteriorly of said shaft into a processing zone adjacent said annular porous filtration member, d. filtrate distribution means circumferentially coaxially in fluid communication with said outflow bore and radially inwardly concentric to said filtration member for distributing filtrate from said filtration member into said outflow bore, e. sealing means juxtaposed above and below said filtration member coaxially fixedly sealingly engaging said shaft and engaging said filtration member for sealing off fluid communication between said fluid suspension distribution means and said filtrate distribution means, f. an inlet conduit providing a fluid path between a remote source of a said fluid suspension to be processed and said inflow bore, g. an outlet conduit providing a fluid path from said outflow bore to a place remote from said shaft, h. means for applying a pressure differential to said inlet and outlet conduits to cause a flow of fluid suspension through such inlet conduit, through said inflow bore, through said fluid suspension distributing means to said processing zone, thence flow of fluid through said filtration member from said outer layer to said inner layer, thence through said filtrate distribute means through said outflow bore to said outlet conduit, and i. means for imparting rotary motion to said rotary shaft 3. In a filtration device including a rotating assembly for filtering fluid medium from matter in a fluid suspension which is external to the rotating assembly, the improvement in the rotating assembly which comprises:

a. a rotary shaft having a longitudinal axis and containing:
  (1) an outflow bore having an axis substantially parallel to the longitudinal axis of said shaft,
  (2) a plurality of circumferential external grooves in the periphery of said shaft, coaxial to the longitudinal axis of said shaft and spaced apart at predetermined intervals along the length of said shaft,
  (3) at least one groove passageway for each siad groove, substantially normal to the axis of said outflow bore and interconnecting each said groove with said outflow bore,
  (4) an inflow bore spaced apart from and substantially parallel to said outflow bore, and
  (5) a plurality of portways from said inflow bore to the exterior of said shaft substantially normal to the axis of said inflow bore, with at least one said portway above, and at least one said portway below, each of adjacent ones of said plurality of circumferential grooves, b. a plurality of annular porous filtration members comprising a porous inner support layer and a porous outer filtration layer enveloping the inner support layer, the pores in the outer layer being smaller than the pores in the inner layer, the pores of said layers being in fluidic communication so that upon immersion in a fluid suspension the fluid medium can pass from one layer to another, each said annular filtration members coaxially fixedly engagingly said shaft with the inner support layer aligned at the inner diameter thereof with a said external groove, c. a plurality of annular sealing and distributing means each having both a circumferential distributing groove in the inner diameter thereof coaxial thereto and at least one fluidway substantially normal to the axis thereof communicating said inner diameter groove exteriorly to the outer diameter thereof, each said annular sealing and distributing means (i) being juxtaposed to each next adjacent filtration member, (ii) coaxially sealingly fixedly engaging said shaft for alignment of said inner diameter groove with a said portway, and (iii) sealingly engaging each said next adjacent filtration member for sealing off fluid communication between said external groove and said inner diameter groove, whereby a continuous fluid path exists from said inflow bore through each said portway through a said inner diameter circumferential groove through a said fluidway to the exterior of said annular sealing and distributing means adjacent a said filtration member, thence through said porous outer filtration layer through said porous inner support layer through said external groove passageway to said outlet bore, d. said shaft being adapted for connection of said inflow bore to an inlet conduit for admission of a fluid suspension to be processed, and for connection of said outlet bore to an outlet conduit for discharge of filtrate of said fluid suspension.

* * * * *